Feb. 6, 1962 E. K. HINE 3,020,007
REVERSING AIRCRAFT PROPELLER
Filed Dec. 10, 1956 2 Sheets-Sheet 1

INVENTOR.
EDWARD K. HINE
BY
Godfrey B. Speir
ATTORNEY

Feb. 6, 1962 E. K. HINE 3,020,007
REVERSING AIRCRAFT PROPELLER
Filed Dec. 10, 1956 2 Sheets-Sheet 2

INVENTOR.
EDWARD K. HINE
BY
William V. Ebs
HIS ATTORNEY

United States Patent Office 3,020,007
Patented Feb. 6, 1962

3,020,007
REVERSING AIRCRAFT PROPELLER
Edward K. Hine, North Caldwell, N.J., assignor to Curtiss-Wright Corporation, a corporation of Delaware
Filed Dec. 10, 1956, Ser. No. 627,313
8 Claims. (Cl. 244—81)

This invention relates to control of variable pitch propellers in aircraft, and provides, particularly, control components to enable the propeller to have two modes of reverse pitch operation.

Propellers in modern aircraft are sometimes arranged for governed forward pitch normal operation, for feathering, for reverse pitch operation, and for fast transition between the forward and reverse pitch ranges to minimize the possibility of engine overspeed during transition when the propeller load on the engine is low. Propellers have been constructed for governing in reverse pitch, under which conditions governor sensing is inverted from the sensing used during forward pitch governing. Reverse sense governing is useful in maneuvers involving reverse pitch descent of an aircraft, for the purpose of expediting let-down from high altitude. Manual control of the propeller under such conditions is difficult, and involves the hazard of overspeeding, underspeeding and the possibility of reverse windmilling of the propeller. In reverse pitch governing of the propeller, high reverse pitch and low reverse pitch limit stops are necessary, respectively of the order of —3° and —20°.

Reverse pitch propellers are more often arranged for either fixed reverse pitch operation, or variable pitch operation by a blade angle control system, and are used for aerodynamic braking of the aircraft after contact has been made with the ground. When grounded, engine speed need not be governed, as it is usually held well below the speeds required for takeoff or flight.

If a propeller is set to a definite reverse pitch blade angle, the amount of reverse thrust needed for proper aircraft braking or maneuvering may be controlled by modifying engine speed. Alternatively, as in a turboprop driven aircraft, the engine is governed to a safe speed by a throttle or fuel governor, and reverse pitch may be controlled by modifying blade angle by a "beta control" arrangement.

The evolution of a complete reverse pitch control arrangement for both in-flight reverse pitch and reverse pitch for ground maneuvering thus encompasses two kinds of reverse pitch control (1) reverse pitch governing for flight and (2) fixed pitch or determinate blade angle control for ground braking and maneuvering. It is an object of the present invention to provide a dual reverse pitch control system to fulfill the above-mentioned need. It is a further object to provide such a dual system which will coordinate effectively with a normal propeller control system to provide the necessary degree of operating safety and automatic operation and to relieve the aircraft pilot of the need for selection of governed or fixed reverse pitch operation.

The invention may be understood in greater detail by reading the following detailed description in connection with the drawings, which cover one embodiment of the invention in an operative developed form. While the embodiment shown is primarily electrically operated and controlled, the invention may be applied with other sorts of operation and control, as will be clear to those versed in the propeller and propeller control arts.

In the drawings wherein similar reference characters relate to similar parts:

FIG. 3 is a box diagram of the propeller control system of the invention.

Figure 1:
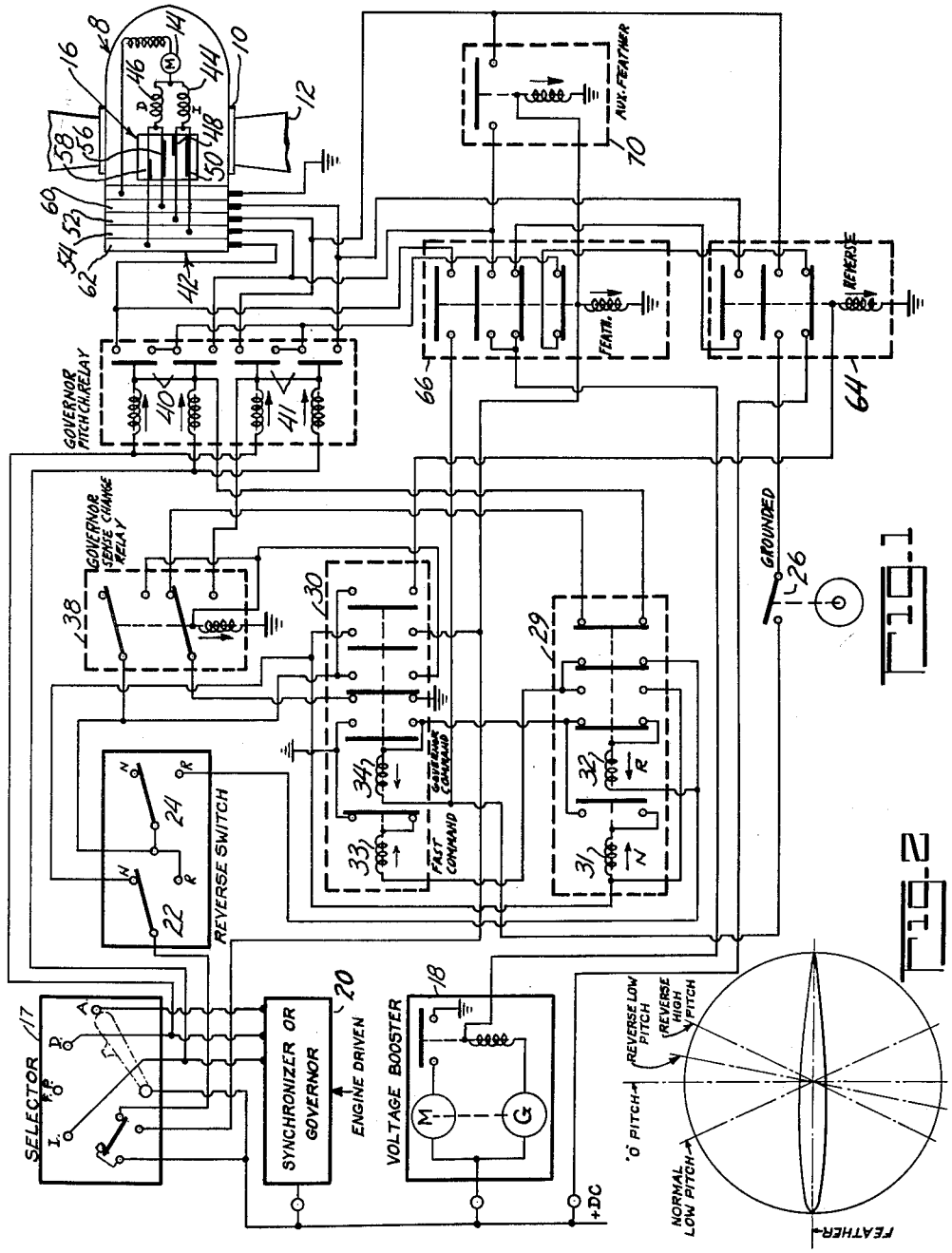
FIG. 1 is a wiring diagram of the control instrumentalities applied to an electrically actuated controllable propeller and FIG. 2 is a diagram showing the pitch ranges for different operating modes of the propeller.

In the following description, phrases will be used for identification of pitch change and pitch positions as follows:

Normal pitch—a blade pitch angle in the forward pitch angle quadrant between 0° pitch and feather.

Feather—a blade angle in the forward pitch angle quadrant approaching 90°.

Flat pitch—a blade angle of substantially 0°, or when the blade surface lies substantially in the plane of rotation.

Low reverse pitch—a blade angle in the reverse pitch angle quadrant, approaching flat pitch; i.e., —3°.

High reverse pitch—a blade angle in the reverse pitch angle quadrant of relatively steeper pitch; i.e., —20°.

Pitch decrease—applied for reducing blade angle in the forward pitch range through flat pitch all the way to high reverse pitch.

Pitch increase—applied for changing blade angle all the way from high reverse pitch through flat pitch and through the normal pitch range to feather.

A propeller is shown at 8 and includes a hub 10, blades 12 swivelled therein for pitch change, and a reversible electric motor 14 in the propeller selectively operable to increase or decrease blade pitch. A set of limit switches 16 of the type shown for example in Patent #2,640,552 of C. W. Chillson, dated June 2, 1953, is arranged in the propeller, to establish limits for "feather," low normal pitch, low reverse pitch and high reverse pitch. The latter limit may be made manually adjustable by suitable means, not shown, for a purpose which will become apparent. The different limit switches are brought into action by selection of the relevant ranges of propeller operation by means to be described.

A range and operational mode selector is shown at 17, comprising a switch manually operable to select (from left to right) "feather," manual pitch increase, fixed pitch, manual pitch decrease, and automatic operation. The feather contact, when active, energizes the pitch increase windings of the motor 14 regardless of existing mode of operation or pitch angle, energizes a voltage booster 18 and increases propeller blade angle until the feather limit switch is opened. The manual pitch decrease and increase contacts energize the propeller pitch decrease and increase windings, respectively, of the motor 14 so long as the propeller is in forward pitch, and so long as the feather and low normal pitch limit switches, respectively, are closed. The fixed pitch contact opens the circuits to the motor 14. The automatic contact normally places the motor 14 under the control of a synchronizer or governor 20, known in the art, which automatically operates the motor 14 to modify propeller blade pitch to maintain constant propeller speed using a normal rate of pitch change. The automatic contact, when active, of selector 17 covers the different modes of forward and reverse pitch operation.

Reverse switches 22 and 24 are separate from switch 17, as they are operated only for special operating needs; their inadvertent operation could be catastrophic at times so they are specially guarded. With the aircraft airborne, when thrown to the reverse position, they complete circuits which take control away from governor 20 temporarily and energize the voltage booster 18 and the pitch decrease windings of motor 14, rapidly shifting blade angle to the reverse range. As the propeller blades reach the low reverse pitch limit, the sense of governor 20 having been reversed, blade angle control is restored to the governor at normal rate of pitch change. Then, the governor (while the aircraft is airborne) increases and decreases reverse pitch to the extent necessary to maintain constant speed reverse pitch operation. However, maximum reverse blade angle is limited by the high reverse limit switch components of assembly 16.

Another switch 26 is connected to terminate action of the governor 20 in reverse pitch, and to energize the decrease pitch windings of motor 14 to shift blade angle to the maximum reverse pitch limit, as limited by the corresponding limit switch. This switch may be manually operated, or may be operated as shown by the aircraft landing gear. This switch 26 is open at all times when the aircraft is grounded. When reverse pitch ground maneuvering of the aircraft is required, activation of reverse switches 22 and 24 will cause the propeller to shift to a fixed reverse pitch setting at the boosted rate of pitch change and reverse thrust on the aircraft is controlled by engine throttle manipulation.

If the high reverse pitch limit is made manually adjustable as mentioned before, engine throttles can be left fixed, and reverse thrust is controllable by varying reverse pitch.

When the reverse switches 22 and 24 are restored to the normal position, the relay system immediately operates to energize the increase pitch windings of motor 14, powered by the voltage booster 18 to shift propeller blade pitch to the positive or normal blade angle range. Thereupon the propeller again comes under the control of the governor in its normal operating sense (if automatic operation remains active) or of the fixed pitch, or manual increase or decrease speed contacts.

The specific switching means for attaining the foregoing functions include relays interconnected as shown in FIG. 1.

Relay 30 has switch gear normally leftwardly shifted for governor or constant speed operation in normal or reverse pitch. It provides the command for relay 29, which is operated to select either normal or reverse pitch position by switches 22 and 24. When relay 30 shifts rightwardly it brings about the energization of relay 66 (provided the reverse switches 22 and 24 are in their normal positions), and thereby closes a circuit between the booster 18 and motor 14 causing the propeller to change pitch. With relay 30 shifted to the right and the switches 22 and 24 in their reverse positions a circuit for the booster is completed over contacts of relays 64 and 66. On completion of the boosted shift from one range to the other, relay 30 again shifts leftwardly to restore the propeller to automatic governed control.

Relay 29 has a solenoid 32 urging leftward switchgear movement, energized by switches 22 and 24 in the reverse or down position. It also has a solenoid 31 energized by switches 22 and 24 in the normal or up position urging the switchgear to the right. Relay 30, with its switchgear normally to the left as shown, has a solenoid 33 energized through switches in relay 29 to shift relay 30 switchgear to the right. A solenoid 34 of relay 30 urges its switchgear to the left upon occurrence of a voltage secured from normal governed range or reverse governed range bars in the propeller limit switch assembly 16, as the propeller pitch moves respectively from the reverse range or from the normal range. This terminates boosted voltage for transition between normal and reverse pitch and restores governor action either at low normal pitch or at low reverse pitch.

Additional switching and circuitry as shown include a relay 38 operable by relays 29 and 30 to select for operation either normal governor-controlled power relays 40 for normal pitch operation, or reverse-sensing governor control power relays 41 for reverse pitch governing operation.

The propeller is connected to the aircraft electrically by a brush and slip ring assembly 42, to enable operation of the motor 14 through limit switch assembly 16. The motor includes an increase pitch winding 44 and a decrease pitch winding 46. Connections to winding 44 are made through a limit switch contact 48 connected with a slip ring 52, covering the range from extreme high reverse pitch to the low limit of reverse pitch. This contact is used for increasing pitch in the reverse governing range. Winding 44 is also energizable through limit switch contact 50 and slip ring 54, this contact covering the range from extreme high reverse pitch to feather. This contact is used for return from reverse, for pitch increase during normal governing, and for feathering from any pitch position of the propeller. Upon feathering, the switch contact 50 opens. However, the decrease contacts 56 and 58 are closed to enable unfeathering.

The limit switch decrease pitch contact 56, connected to slip ring 60 and to the pitch decrease winding 46, enables pitch decrease from feather all the way to high reverse pitch. At the high reverse pitch limit, pitch increase contacts 48 and 50 are closed, ready to start pitch increase. This contact is used to reverse pitch from any normal blade angle, and to decrease blade pitch from low reverse pitch to high reverse pitch. Winding 46 is also energizable from contact 58 connected to slip ring 62, the contact covering the range from feather to normal low pitch. This contact is used for normal unfeathering and for pitch decrease in the normal governing range.

A reversing booster relay 64 in the circuit is operated by relay 30 rightward shift to connect booster voltage to the reverse pitch slip ring 60. This connection, however, is made through a feather and return from reverse booster relay 66 when the latter is relaxed. Relay 66, energized by switch 17 in the feather position, connects power from booster 18 to the feather slip ring 54 of the propeller, and takes priority over any other control through the additional connections shown.

|  | Normal Governing Air or Ground (Normal Pitch Change Rate) | Change to Reverse Airborne (Increased Pitch Change Rate) | Reverse Governor (Normal Pitch Change Rate) | Change to Reverse Grounded (Increased Pitch Change Rate) | Fixed Reverse | Return from Reverse Start (Increased Pitch Change Rate) | Return from Reverse Finish | Feather from any Pitch (Increased Pitch Change Rate) |
|---|---|---|---|---|---|---|---|---|
| Selector Sw. 17 | Auto | Auto | Auto | Auto | Auto | Auto | Auto | Any. |
| Reverse Switch 22, 24 | Up | Down | Down | Down | Down | Up | Up | Any. |
| Latch Relay 30 | Left | Right | Left | Right | Left | Right | Left | Any. |
| Latch Relay 29 | Right | Left | Left | Left | Left | Right | Right | Any. |
| Governor Sense Rel. 38 | Up | Down | Down | Down | Down | Up | Up | Any. |
| Norm Governor Power Rel. 40 | Active | Inactive | Inactive | Inactive | Inactive | Inactive | Active | Inactive. |
| Rev. Governor Power Rel. 41 | Inactive | Inactive | Active | Inactive | Inactive | Inactive | Inactive | Inactive. |
| Ret. and F. Relay | Inactive | Inactive | Inactive | Inactive | Inactive | Active | Inactive | Active. |
| Rev. Relay 64 (Follows 30) | Inactive | Active | Inactive | Active | Inactive | Inactive | Inactive | Any. |
| L. G. Sw. 26 | Either | Closed | Closed | Open | Open | Either | Either | Either. |
| Booster 18 | Off | On | Off | On | Off | On | Off | On. |
| Sync. 20 | Operating | Disconnected | Operating | Disconnected | Disconnected | Disconnected | Operating | Disconnected. |
| Active Slip R | 62, 54 | 60 | 52, 60 | 60 | None | 52, 54 | 62, 54 | 54, 52. |
| Lim. Sw. Act | 50, 58 | 58 | 48, 56 | 56 | None | 48, 50 | 50, 58 | 50. |
| Mot. Wndg. Act | Either | 46 | Either | 46 | Neither | 44 | Either | 44. |

A number of connections are made and broken by the several relays to provide control priorities when appropriate as the different control functions are called for. These interconnections also prevent circuits from blocking or bucking one another, and also prevent "sneak" circuits from being formed.

There appears to be no need for detailing the connections. Rather, the function of the system may readily be traced from the diagram, in connection with the chart attached, which sets forth the activity of the various components during the several system operating modes.

Termination of booster action upon arrival of blades at the low normal pitch or the low reverse pitch of the fast unreverse or fast reverse, when these movements are called for, is respectively secured by closing of contacts 58 and 48 which energize solenoid 34 of relay 30, shifting the latter to cut off boosted power to the pitch change motor.

Figure 2:
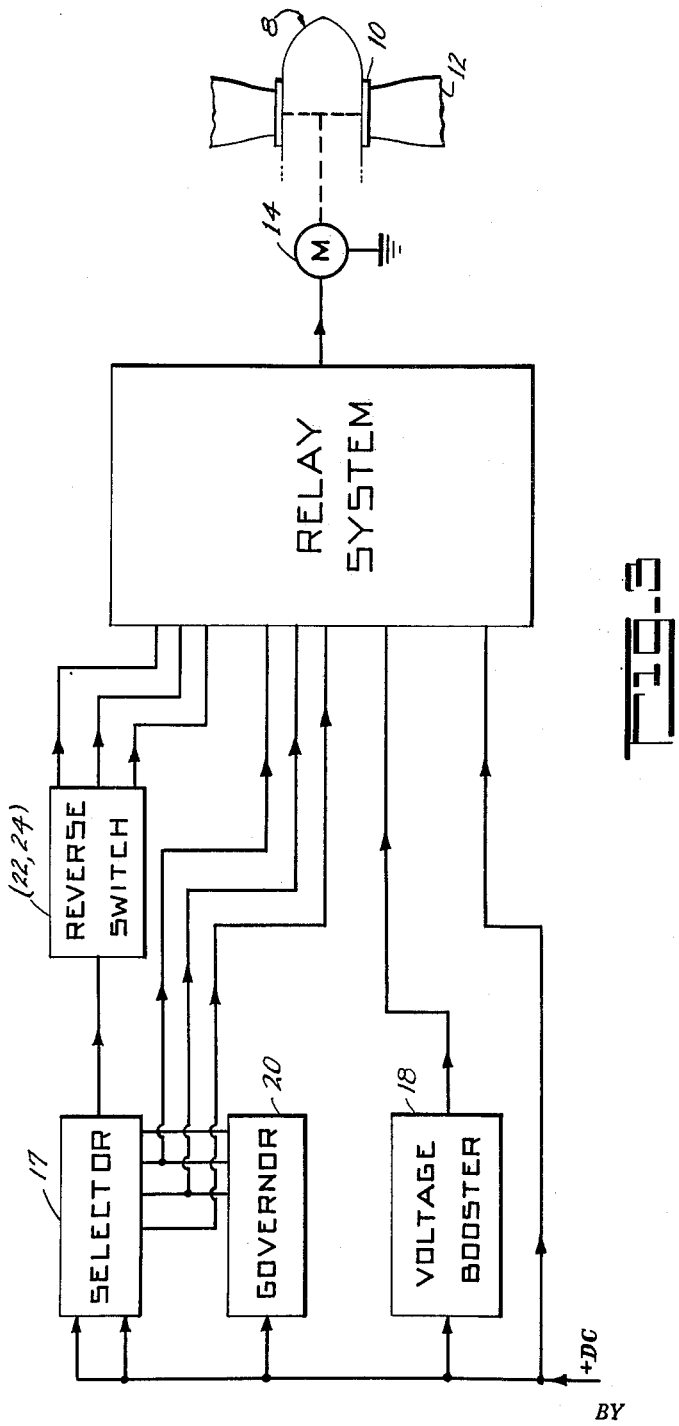

The control system of the invention is illustrated in box diagram form in FIG. 3 to show the interrelation of main components and facilitate an understanding of the system. Corresponding components in FIGS. 2 and 3 are labeled in like manner. The relay system of FIG. 3 includes the relays 29, 30, 38, 40, 41, 64, 65, 70, switch 26, and associated circuitry. Also included in the box labeled "Relay System" are the propeller brush and slip ring assembly 42, limit switch assembly 16, and associated circuitry.

In addition to the electrical control system above described, it may be desirable to incorporate positive mechanical stops, well known in the art, to limit pitch change beyond desirable working angles. As suggested previously, the invention contemplates the use of other forms of pitch change and control mechanisms than those shown, insofar as such other forms are covered by the patent claims. Also, modifications and changes may be made in the apparatus shown and described without affecting the spirit or scope of the invention.

I claim:

1. In an aircraft propeller, a reversible electric motor connected to the blades of the propeller and energizable to increase and decrease blade pitch between a maximum reverse angle and a feather angle, governor means connectable to said motor to energize same to hold constant propeller speed by blade pitch adjustment, switch means to invert the effect of the governor on the motor, and a sequencing relay system connected to said motor operable to select normal pitch governing, reverse pitch governing through said switch means, and reverse pitch free of control by said governor.

2. An aircraft propeller according to claim 1, including second switch means movable accordingly as the aircraft is airborne or grounded, and connections between said second switch means and said relay system operative respectively to render the governor operative in reverse pitch, and to disconnect said governor during reverse pitch propeller operation.

3. In an aircraft, a control system for a reversible aeronautical propeller comprising a motor for moving propeller blades to change blade pitch, and means for controlling the operation of the motor; said means including a relay system connected to the motor, switching means for operating the relay system to reverse blade pitch, a governor connectible through the relay system with the motor for controlling the motor to maintain propeller speed constant, power boosting means connectible through the relay system with the motor for increasing the speed at which the motor may operate to change blade pitch, said relay system including devices for disconnecting the governor from the motor during a blade shift from forward to reverse pitch and for reconnecting the governor to the motor when said blade shift is accomplished, said relay system also including means operable to provide for governor control of blade pitch or a fixed reverse position of the propeller blades when the propeller is in reverse pitch according to whether the aircraft is airborne or grounded.

4. In an aircraft, a control system for a reversible pitch aeronautical propeller comprising a motor for moving propeller blades to change blade pitch and means for controlling the operation of the motor; said means including a relay system connected to the motor, switching means for controlling the relay system and operable to reverse blade pitch during flight, a governor connectible through the relay system with the motor for controlling the motor to maintain propeller speed constant, said relay system including devices for disconnecting the governor from the motor during blade shift from forward to reverse pitch and for reconnecting the governor to the motor when said blade shift is accomplished, said relay system also including means operable to provide for governor control of blade pitch or a fixed reverse position of the propeller blades when the propeller is in reverse pitch according to whether the aircraft is airborne or gounded.

5. A system according to claim 4 wherein the relay system includes high and low reverse pitch limit stops between which blade movement is limited when the propeller is governing in reverse pitch.

6. A system according to claim 5 wherein fixed reversed pitch is at a value established by said reverse high pitch limit stop.

7. A system according to claim 4 wherein said last mentioned means includes a switch operated by the aircraft landing gear.

8. A system according to claim 4 including a propeller feathering control connected to the relay system and wherein the relay system includes means responsive to operation thereof for controlling said motor means to feather the propeller blades from any other blade pitch position in the operating range.

References Cited in the file of this patent

UNITED STATES PATENTS

| | | |
|---|---|---|
| 2,402,065 | Martin | June 11, 1946 |
| 2,593,910 | Morris et al. | Apr. 22, 1952 |
| 2,701,111 | Schuck | Feb. 1, 1955 |
| 2,756,012 | Moore | July 24, 1956 |